(12) United States Patent
Peng et al.

(10) Patent No.: US 11,034,450 B2
(45) Date of Patent: Jun. 15, 2021

(54) AIRCRAFT-BASED FUNCTION CONTROL METHOD AND DEVICE

(71) Applicant: SZ DJI TECHNOLOGY CO., LTD., Shenzhen (CN)

(72) Inventors: Zhaoliang Peng, Shenzhen (CN); Chaobin Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 122 days.

(21) Appl. No.: 16/356,839

(22) Filed: Mar. 18, 2019

(65) Prior Publication Data

US 2019/0212756 A1 Jul. 11, 2019

Related U.S. Application Data

(63) Continuation of application No. PCT/CN2016/099724, filed on Sep. 22, 2016.

(51) Int. Cl.
*G05D 1/10* (2006.01)
*G05D 1/00* (2006.01)
(Continued)

(52) U.S. Cl.
CPC ............ *B64C 39/024* (2013.01); *B64C 39/02* (2013.01); *G05D 1/0011* (2013.01); *G08G 5/0013* (2013.01); *G08G 5/0021* (2013.01); *G08G 5/0052* (2013.01); *G08G 5/0069* (2013.01); *H04W 4/00* (2013.01); *H04W 84/00* (2013.01); *B64C 2201/127* (2013.01); *B64C 2201/141* (2013.01)

(58) Field of Classification Search
CPC . B64C 39/024; B64C 39/02; B64C 2201/127; B64C 2201/141; B64C 2201/146; B64C 2201/145; B64C 2201/123; G08G 5/0052; G08G 5/0013; G08G 5/0021; G08G 5/0069; H04W 4/00; H04W 84/00; H04W 4/42; G05D 1/0011

See application file for complete search history.

(56) References Cited

U.S. PATENT DOCUMENTS

2013/0162822 A1 6/2013 Lee et al.
2016/0232794 A1 8/2016 Hafeez et al.

FOREIGN PATENT DOCUMENTS

CN 103455036 A 12/2013
CN 104301614 A 1/2015
(Continued)

OTHER PUBLICATIONS

The World Intellectual Property Organization (WIPO) International Search Report for PCT/CN2016/099724 dated May 31, 2017 8 Pages.

*Primary Examiner* — Brian P Sweeney
(74) *Attorney, Agent, or Firm* — Anova Law Group, PLLC (57) ABSTRACT

A control method includes obtaining a flight parameter of an aircraft during flight, where the flight parameter is configured to control an operation component carried by the aircraft and includes at least one of a flight time parameter or a flight distance parameter; and controlling the operation component to operate in response to at least one of the flight time parameter satisfying a time requirement included in a control condition or the flight distance parameter satisfying a distance requirement included in the control condition.

16 Claims, 4 Drawing Sheets

(51) Int. Cl.
*G08G 5/00* (2006.01)
*B64C 39/02* (2006.01)
*H04W 4/00* (2018.01)
*H04W 84/00* (2009.01)

(56) References Cited

FOREIGN PATENT DOCUMENTS

| | | | | |
|---|---|---|---|---|
| CN | 104670496 | A | | 6/2015 |
| CN | 105182992 | A | | 12/2015 |
| CN | 105366059 | A | | 3/2016 |
| CN | 105487551 | A | * | 4/2016 ............ G05D 1/101 |
| CN | 105606073 | A | | 5/2016 |
| CN | 105867416 | A | | 8/2016 |
| CN | 105905302 | A | | 8/2016 |
| CN | 205507548 | U | | 8/2016 |
| JP | 2016144990 | A | | 8/2016 |

* cited by examiner

AIRCRAFT-BASED FUNCTION CONTROL METHOD AND DEVICE

CROSS-REFERENCE TO RELATED APPLICATION

This application is a continuation application of International Application No. PCT/CN2016/099724, filed on Sep. 22, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of flight control technology and, more particularly, to a method and a device for aircraft-based function control.

BACKGROUND

Unmanned aerial vehicles (UAVs) have broad applications in more and more industries. Thus, UAVs may execute more operations to achieve more functions, such as photo taking operations, or pesticide spraying operations. There is a need to control a corresponding operation component, e.g., a camera mounted to a UAV, such that the UAV can better achieve corresponding functions.

SUMMARY

In accordance with the disclosure, there is provided a control method. The control method includes obtaining a flight parameter of an aircraft during flight, where the flight parameter is configured to control an operation component carried by the aircraft and includes at least one of a flight time parameter or a flight distance parameter; and controlling the operation component to operate in response to at least one of the flight time parameter satisfying a time requirement included in a control condition or the flight distance parameter satisfying a distance requirement included in the control condition.

Also in accordance with the disclosure, there is provided a control device including a processor and a memory that stores instructions. The instructions, when executed by the processor, cause the processor to obtain a flight parameter of an aircraft during flight, where the flight parameter is configured to control an operation component carried by the aircraft and includes at least one of a flight time parameter or a flight distance parameter; and control the operation component to operate in response to at least one of the flight time parameter satisfying a time requirement included in a control condition or the flight distance parameter satisfying a distance requirement included in the control condition.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first assembly is referred to as "fixed to" a second assembly, it is intended that the first assembly may be directly attached to the second assembly or may be indirectly attached to the second assembly via another assembly. When a first assembly is referred to as "connecting" to a second assembly, it is intended that the first assembly may be directly connected to the second assembly or may be indirectly connected to the second assembly via a third assembly between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

An unmanned aerial vehicle (UAV) can be remotely controlled by a user, and can fly to a destination area and perform various tasks. In civil fields, a camera can be mounted on a UAV, and through the camera, the user can monitor a target area. The function may be used in various scenarios, such as disaster rescue and relief and geological monitoring. The UAV can also carry a spraying device. The spraying device may include a box for containing mixture liquid of pesticides, water, and the like and a spraying mechanism. The UAV with the spraying device may have applications in agricultural, may satisfy automation and intellectualization needs of users in pesticide spraying and other scenes, and may improve spraying effectiveness.

In some embodiments, the user can configure control conditions such as time and/or distance, such that the UAV carrying an operation component, such as a camera or a spraying device, can control the operation component to perform operations at a preset time and/or a preset distance. For example, a UAV carrying a camera may control the camera to capture images at a preset time and/or a preset distance. As another example, a UAV carrying a spraying device may control the spraying device to spray pesticides at a preset time and/or a preset distance. Various operation components can be carried by the UAV. The operation component may include the above-described camera or spraying device. Further, the operation component may include a radar device, an infrared device, or the like, or a weapon system or the like in the military field, which is not restricted in the present disclosure.

Figure 1:
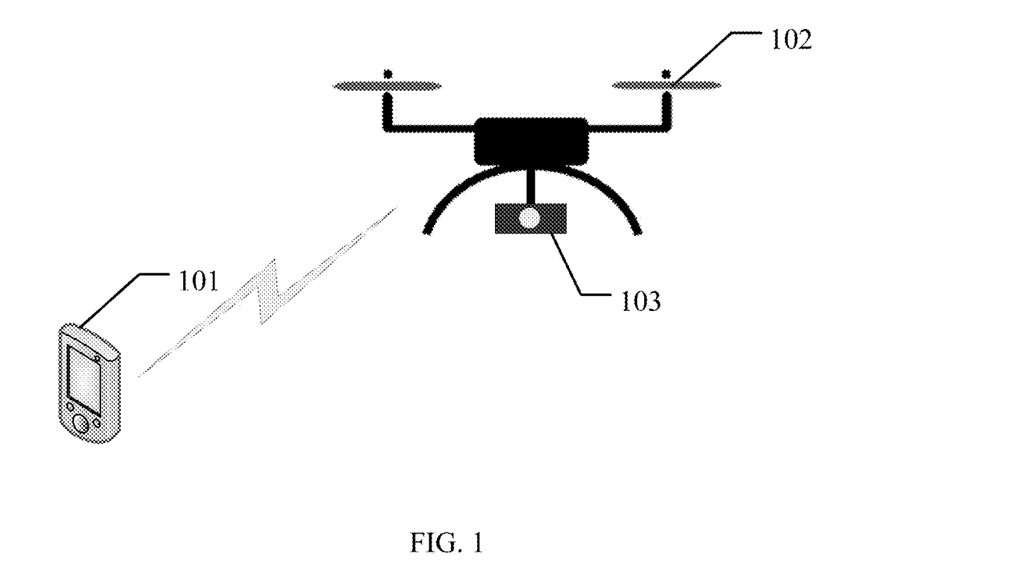
FIG. 1 illustrates a schematic structural diagram of an exemplary flight system according to various disclosed embodiments of the present disclosure.

FIG. 1 illustrates a schematic structural diagram of a flight system according to various disclosed embodiments of the present disclosure. The flight system includes a remote controller 101, a UAV 102 (as an example of an "aircraft"), and an operation component 103 carried by the UAV 102. The remote controller 101 may include a smart terminal. The smart terminal may include a smart phone, a tablet computer, or another terminal with a wireless transmission function. Applications (APPs), i.e., application programs, can be installed on the terminal. Through the installed APPs, a user may complete configurations of time requirements and distance requirements in control conditions. In some embodiments, edit templates of time requirement parameters and distance requirement parameters may be imported as needed. Parameters such as a time interval or a distance interval may be configured. Further, preset processing of control conditions may be completed in advance.

After the preset processing of the control conditions are completed, the operation component can be functionally controlled according to a flight status of the aircraft. That is, after the preset processing of the control conditions are completed, a function of the operation component can be controlled according to the flight status of the aircraft. Consistent with embodiments of the present disclosure, in order to better satisfy the needs for automation and intellectualization, corresponding processing of function control may be performed in the aircraft. After the user completes configurations of the demand parameters such as a time interval or a distance interval and determines control conditions on the remote controller 101, the remote controller 101 may send the control conditions to the UAV 102. A flight controller or another suitable circuit of the aircraft, a processor provided in the aircraft that is capable of directly controlling an operation component, or the like may control a camera, a spraying device, or another suitable operation component carried by the aircraft.

After the aircraft receives the control conditions, the aircraft may store the control conditions in a controller of the aircraft. The aircraft can collect flight parameters of the aircraft in real time when the aircraft receives a takeoff instruction to start executing a mission. The flight parameters are selectively collected and obtained according to requirement parameters in the control conditions.

In some embodiments, if a requirement parameter in the control conditions includes a time requirement parameter, such as a time interval or a time duration, the aircraft may collect and obtain a time interval or a time duration after the takeoff, and may collect the time interval or the time duration using a timer. The timer may start counting after the aircraft takes off or after a preset time duration since the aircraft takes off. In the case of time interval, the timer may count down. For example, if the time interval is 10 minutes, timer may the count down from 10 minutes to determine the time interval. In the case of time duration, the timer may perform forward counting to determine, e.g., 5-minute time duration, 15-minute time duration, 1-hour time duration, or the like.

After the time duration of flight is obtained, if the obtained time duration of flight is equal to a time duration configured in the control conditions, the operation component may be controlled to start operating. For example, the aircraft may control the camera to start taking a picture or a video of a preset time duration or may control the spraying device to spray pesticides within a preset time duration. After the time interval is obtained, if the obtained time interval is equal to a time interval configured in the control conditions, the operation component may be controlled to start operating.

In some embodiments, if a requirement parameter in the control conditions includes a distance requirement parameter, a global positioning system (GPS)/real-time kinematic (RTK), and/or a sensor for altitude measurement may be used to collect and obtain length information in a flight route that the aircraft has traveled, i.e., a distance between two flight waypoints on the flight route or a horizontal distance between two flight waypoints, etc., an flight altitude that has been traveled, and/or another suitable parameter.

After the length information is obtained, if the obtained length information is the same as length information included in the control conditions, the operation component may be controlled to start operating. For example, the aircraft may control the camera to start taking a picture or a video of a preset time duration or may control the spraying device to spray pesticides within a preset time duration. After the flight altitude information is obtained, if the obtained flight altitude information is the same as altitude information included in the control conditions, the operation component may be controlled to start operating.

In some other embodiments, corresponding processing of function control may be performed in a smart terminal serving as a remote controller. For example, after the smart terminal completes a pre-configuration of one or more control conditions according to information inputted by the user, the smart terminal may receive flight parameters in real time from the aircraft, such as a time duration, a time interval, flight length information and/or flight altitude after the aircraft takes off. The received flight parameters may be analyzed according to the preset control conditions. If the flight parameters satisfy the preset control conditions, a control signal may be generated and sent by the smart terminal to the operation component carried by the aircraft, e.g., directly sent to the operation component or sent to the aircraft then forwarded by the aircraft to the operation component, such that the operation component may be controlled to start operating. The difference between performing the corresponding process of the function control in the remote controller and performing the corresponding process of the function control in the aircraft is that, the remote control may need to interact with the aircraft to receive the flight parameters, may need to generate control instructions for controlling the operation component, and may need to send the control instructions to the operation component through wireless transmission. For performing the corresponding process of function control in the remote control, references can be made to the above descriptions of performing the corresponding processes of function control in the aircraft.

Figure 2:
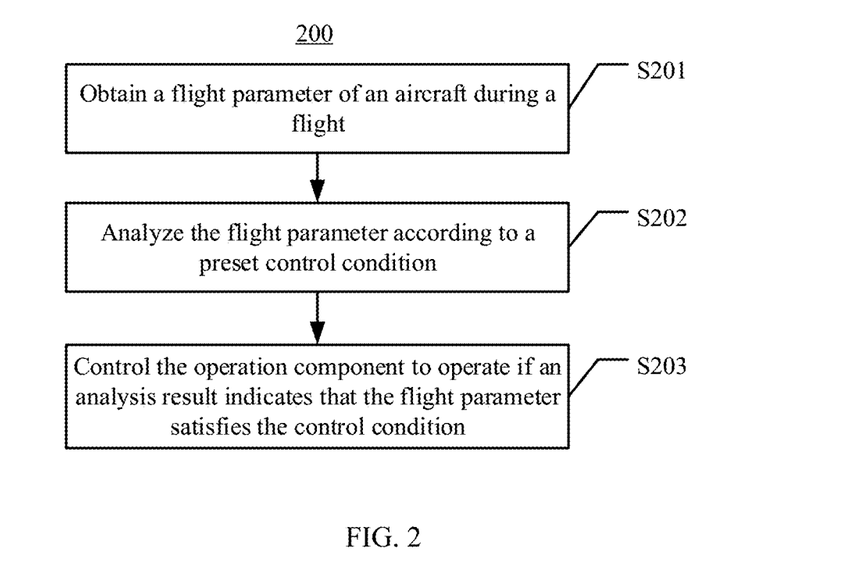
FIG. 2 illustrates a flowchart of an exemplary aircraft-based function control method according to various disclosed embodiments of the present disclosure.

FIG. 2 illustrates a flowchart of an exemplary aircraft-based function control method 200 according to various disclosed embodiments of the present disclosure. In the present disclosure, the method 200 may be executed by an aircraft or by a smart terminal. In some embodiments, the aircraft may be, for example, a quadrotor UAV, a six-rotor UAV, or any UAV with a smart flight function. The smart terminal may be a smart phone, a tablet computer, a smart wearable device, or any suitable terminal with a wireless transmission function. With reference to FIG. 2, the method 200 is described below.

At S201, a flight parameter of an aircraft during a flight is obtained. The flight parameter may include a selected parameter for controlling an operation component carried by the aircraft to operate. The flight parameter may include a flight time parameter and/or a flight distance parameter. The flight parameter to be obtained may be selected according to a requirement parameter in a control condition. For example, the flight parameter may include a flight time parameter such as a flight duration after the aircraft takes off, a flight time interval after the aircraft takes off, or the like, and/or a flight distance parameter such as length information and/or altitude information of the flight router that the aircraft has traveled after taking off.

At S202, the flight parameter is analyzed according to a preset control condition. Analyzing the flight parameter may include comparing the obtained flight parameter with the requirement parameter in the control condition. The control condition may be configured in advance according to time or distance inputted by the user. In some embodiments, a control condition may include determining whether a time parameter in the flight parameter is equal to the time inputted by the user. If the two are equal, the control condition is satisfied, and the operation component is controlled. As such, the operation component can be controlled to operate at a preset time. In some other embodiments, a control condition may include determining whether a distance parameter in the flight parameter is equal to the distance inputted by the user. If the two are equal, the control condition is satisfied, and the operation component is controlled. As such, the operation component can be controlled to operate at a preset distance.

At S203, the operation component is controlled to operate if an analysis result indicates that the flight parameter satisfies the control condition. The flight parameter satisfying the control condition may include that a flight time parameter satisfies a time requirement included in the control condition and/or that a flight distance parameter satisfies a distance requirement included in the control condition.

In order to better satisfy the customized needs of the user, the aircraft-based function control method may be applied separately to a target flight segment of a flight route of the aircraft. The target flight segment may include some or all flight segments of the flight route of the aircraft. Through a user interface, the user may select a flight segment or a plurality of flight segments of the flight route as the target flight segment(s). If it is detected that the aircraft fly into a target flight segment, process S201 is executed. Further, in order to allow the user to select different angles when the operation component performs photographing or spraying, a user interface may also be provided for configuring an angle of a gimbal, i.e., an operation angle, where the gimbal is configured to carry and fix the operation component thereto. A certain angle of the gimbal may be configured. When the operation component is controlled to start operating, a movement of the gimbal may be controlled, such that the operation component may operate at the configured angle.

In some embodiments, an application program interface (API) and a user interface can be provided, in which various parameters can be configured. During a flight, the UAV may determine, according to various parameters configured by the user, one or more control conditions, one or more operation angles, one or more operation time duration parameters, one or more operation component parameters, etc., for controlling the operation component to operate and complete a flight mission. The operation component parameter may refer to a parameter of the operation component during actual operation. For example, if the operation component is a camera, the operation component parameter may include a sensitivity, a shutter, an aperture, and/or another related parameter. If the operation component is a spaying device, the operation component parameter may include a nozzle flow rate, a nozzle operating pressure, and/or another related parameter.

The present disclosure further provides a computer storage medium having program instructions stored thereon. When executed, the program instructions cause a processor to perform a method consistent with the disclosure, such as the method described above with reference to FIG. 2. The program instructions are also referred to as instructions.

According to the present disclosure, an operation component such as a camera or a spraying device carried by an aircraft can be controlled to operate according to a flight parameter of the aircraft and a control condition configured based on user needs. Automatic control such as an operation at a preset time and/or a preset distance may be achieved to satisfy the user needs for automation and intellectualization of photographing, spraying, or another operation.

Figure 3:
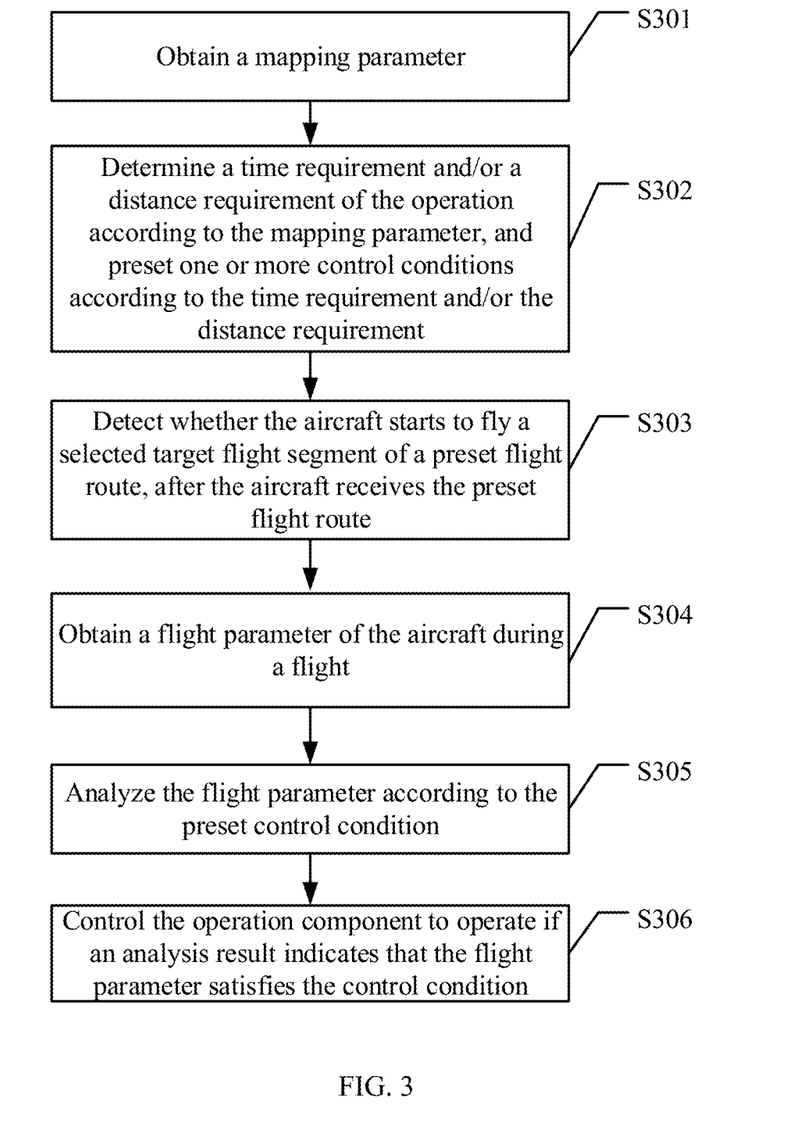
FIG. 3 illustrates a flowchart of another exemplary aircraft-based function control method according to various disclosed embodiments of the present disclosure.

FIG. 3 illustrates a flowchart of another aircraft-based function control method according to various disclosed embodiments of the present disclosure. In the present disclosure, the method may be executed by an aircraft or by a smart terminal. In some embodiments, the aircraft may be, for example, a quadrotor UAV, a six-rotor UAV, or any UAV with a smart flight function. The smart terminal may be a smart phone, a tablet computer, a smart wearable device, or another suitable terminal with a wireless transmission function. With reference to FIG. 3, the method is described below.

At S301, a mapping parameter is obtained. The mapping parameter may include a flight altitude or an operation coverage ratio. The mapping parameter may refer to the user's operation requirement on the operation component carried by the aircraft. The operation coverage ratio may include monitoring or spraying coverage of an area traversed by the aircraft in the flight.

At S302, a time requirement and/or a distance requirement of the operation are/is determined according to the mapping parameter, and one or more control conditions are preset according to the time requirement and/or the distance requirement. The higher the flight altitude is or the lower the operation coverage is, the longer is the time requirement parameter and/or the distance requirement parameter for configuring the control condition.

At the same time as obtaining the mapping parameter or at another time, one or more configured control parameters may be received. The one or more control parameters may include at least one of a parameter for adjusting an operation angle of the operation component in an operation process, an operation time duration parameter, or an operation component parameter. The one or more control parameters may be received from the user interface after the user configures on the user interface. The operation angle may refer to a shot angle of the camera, a spraying angle of the spraying device, or the like. The operation time duration, i.e., the operation time duration parameter, may refer to a time duration of shooting after the camera starts shooting or a time duration of spraying after the spraying device starts spraying. The operation component parameter may refer to an equipment parameter for a camera or a spraying device, and may be white balance, aperture, shutter or another suitable parameter of the camera or may be a nozzle flow rate, an operation pressure, or another suitable parameter of the spraying device.

At S303, after the aircraft receives a preset flight route, it is detected whether the aircraft starts to fly a selected target flight segment of the preset flight route. When the aircraft performs a flight mode, the user may be allowed to separately configure the function control to be performed on each flight segment. The user may designate one or more flight segments of the flight route configured for the aircraft as target flight segments. The user may configure the target flight segments, and may separately determine function controls to be performed on the target flight segments. For example, taking photos at a preset time (configurable timing can be set) may be performed in a first target segment. As another example, taking photos at a preset distance (configurable distance can be set) may be performed in a second target segment. Further, performing no operation may be configured for some target flight segments.

At S304, a flight parameter of the aircraft during a flight is obtained. In some embodiments, the flight parameter is obtained when it is detected that the aircraft starts to fly the selected target flight segment of the preset flight route. The flight parameter may be a selected parameter for controlling an operation component carried by the aircraft to operate. The flight parameter may include a flight time parameter and/or a flight distance parameter.

At S305, the flight parameter is analyzed according to the preset control condition.

At S306, the operation component is controlled to operate if an analysis result indicates that the flight parameter satisfies the control condition. The flight parameter satisfying the control condition may include that a flight time parameter satisfies a time requirement included in the control condition and/or that a flight distance parameter satisfies a distance requirement included in the control condition.

In some embodiments, the obtained flight time parameter may include a flight time duration obtained by starting timing after the aircraft is detected to have taken off. The flight time parameter satisfying the time requirement included in the control condition may include that the flight time duration is equal to a time duration configured in the control condition.

In some embodiments, the obtained flight time parameter may include a calculated time interval after the aircraft takes off. The flight time parameter satisfying the time requirement included in the control condition may include that the time interval is equal to an interval configured in the control condition.

In some embodiments, the obtained flight distance parameter may include calculated length information of a traveled portion of the flight route after the aircraft is detected to have taken off. The flight distance parameter satisfying the distance requirement included in the control condition may include that the length information obtained by calculation is the same as length information included in the control condition. The traveled portion of the flight route may refer to the portion of the flight route that the aircraft has traveled.

In some embodiments, the obtained flight distance parameter may include calculated flight altitude information after the aircraft is detected to have taken off. The flight distance parameter satisfying the distance requirement included in the control condition may include that the flight altitude information obtained by calculation is the same as altitude information included in the control condition.

The present disclosure also provides a computer storage medium having program instructions stored thereon. When executed, the program instructions cause a processor to perform a method consistent with the disclosure, such as the method described above with reference to FIG. 3.

According to the present disclosure, an operation component such as a camera or a spraying device carried by an aircraft can be controlled to operate according to a flight parameter of the aircraft and a control condition configured based on user needs. Automatic control such as operations at a preset time and/or a preset distance may be achieved to satisfy user needs for automation and intellectualization of photographing, spraying, or another operation. Further, according to the user's needs, the function control of the operation component can be performed on some or all flight segments of a flight route, such that the aircraft-based operation control may be more intelligent.

The present disclosure provides an aircraft-based function control device, as described below in detail.

Figure 4:
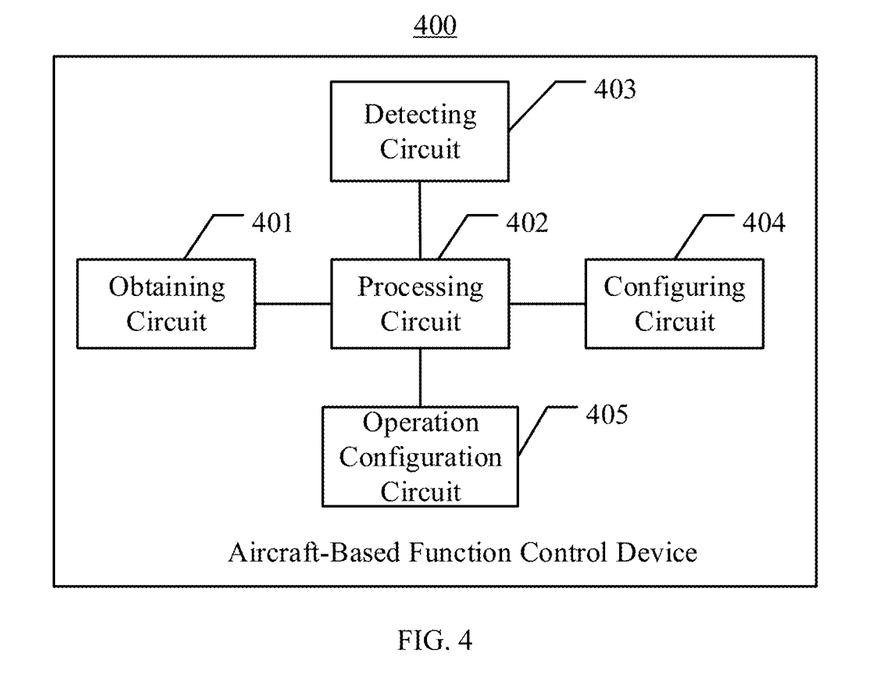
FIG. 4 illustrates a block diagram of an aircraft-based function control device according to various disclosed embodiments of the present disclosure.

FIG. 4 illustrates a block diagram of an aircraft-based function control device 400 according to various disclosed embodiments of the present disclosure. In the present disclosure, the device 400 may be implemented in an aircraft or a smart terminal. With reference to FIG. 4, the device 400 is described below.

As shown in FIG. 4, the device 400 includes an obtaining circuit 401 and a processing circuit 402. The obtaining circuit 401 is configured to obtain a flight parameter of an aircraft during flight. The flight parameter may be a selected parameter for controlling an operation component carried by the aircraft to operate. The flight parameter may include a flight time parameter and/or a flight distance parameter. The processing circuit 402 is configured to analyze the flight parameter according to a preset control condition, and control the operation component to operate if an analysis result indicates that the flight parameter satisfies the control condition. The flight parameter can include one or more flight parameters, and the control condition can include one or more control conditions. The flight parameter satisfying the control condition may include that a flight time parameter satisfies a time requirement included in the control condition, and/or that a flight distance parameter satisfies a distance requirement included in the control condition.

In some embodiments, as shown in FIG. 4, the device 400 further includes a detecting circuit 403. The detecting circuit 403 may be configured to detect whether the aircraft starts to fly a selected target segment of a preset flight route after the aircraft receives the preset flight route, and notify the obtaining circuit 401 in response to detecting that the aircraft starts to fly the selected target segment of the preset flight route after the aircraft receives the preset flight route.

In some embodiments, as shown in FIG. 4, the device 400 further includes a configuring circuit 404. The configuring circuit 404 may be configured to receive a configured control parameter. The control parameter may include at least one of a parameter for adjusting an operation angle of the operation component in an operation process, an operation time duration parameter, or an operation component parameter.

In some embodiments, the obtained flight time parameter may include a flight time duration obtained by starting timing after the aircraft is detected to have taken off. The flight time parameter satisfying the time requirement included in the control condition may include that the flight time duration is equal to a time duration configured in the control condition.

In some embodiments, the obtained flight time parameter may include a calculated time interval after the aircraft takes off. The flight time parameter satisfying the time requirement included in the control condition may include that the time interval is equal to an interval configured in the control condition.

In some embodiments, the obtained flight distance parameter may include calculated length information of a traveled portion of the flight route after the aircraft is detected to have taken off. The flight distance parameter satisfying the distance requirement included in the control condition may include that the calculated length information is the same as length information included in the control condition.

In some embodiments, the obtained flight distance parameter may include calculated flight altitude information after the aircraft is detected to have taken off. The flight distance parameter satisfying the distance requirement included in the control condition may include that the calculated flight altitude information is the same as altitude information included in the control condition.

In some embodiments, as shown in FIG. 4, the device 400 further includes an operation configuration circuit 405. The operation configuration circuit 405 may be configured to obtain a mapping parameter, determine a time requirement and/or a distance requirement of the operation according to the mapping parameter, and preset one or more control condition according to the time requirement and/or the distance requirement. The mapping parameter includes a flight altitude or an operation coverage ratio.

For implementations of each circuit of the device of the present disclosure, reference can be made to the descriptions of related contents in the above-described embodiments, such as embodiments corresponding to FIGS. 1 to 3, which are not repeated here.

According to the present disclosure, an operation component such as a camera or a spraying device carried by an aircraft can be controlled to operate according to a flight parameter of the aircraft and a control condition configured based on user needs. Automatic control such as operations at a preset time and/or a preset distance may be achieved to satisfy user needs for automation and intellectualization of photographing, spraying, or another operation. Further, according to the user's needs, the function control of the operation component can be performed on some or all flight segments of a flight route, such that the aircraft-based operation control may be more intelligent.

Figure 5:
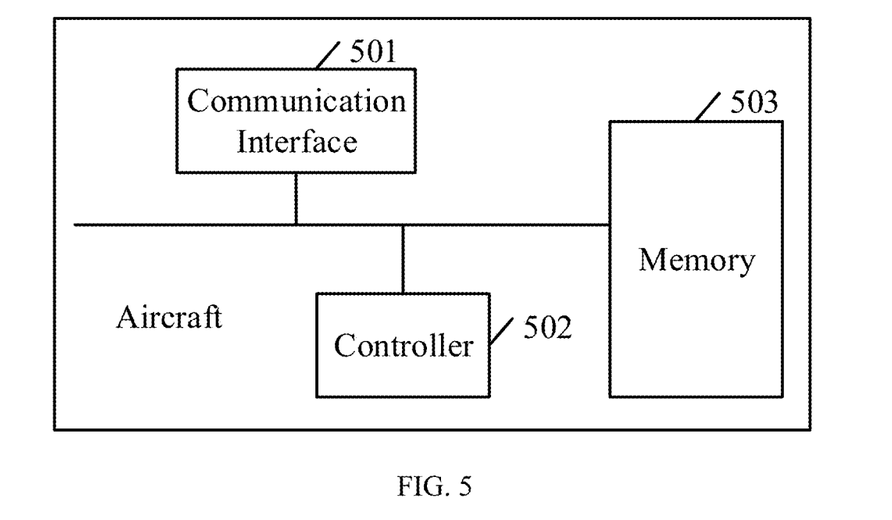
FIG. 5 illustrates a block diagram of an exemplary aircraft according to various disclosed embodiments of the present disclosure.

FIG. 5 illustrates a block diagram of an exemplary aircraft according to various disclosed embodiments of the present disclosure. The aircraft may include a rotor, a power supply, a landing gear, and/or the like (not shown in FIG. 5). In the embodiments of the present disclosure, as shown in FIG. 5, the aircraft further includes a communication interface 501, a controller 502, and a memory 503. The communication interface 501, the controller 502, and the memory 503 may be coupled to each other through data connections.

The communication interface 501 may communicate with a remote controller of a ground terminal for receiving data from the ground terminal. The received data may include flight control instructions for the aircraft, various parameters configured by the user through the remote controller, various control conditions and control logics generate by the remote controller, and/or the like.

In some embodiments, the memory 503 may include a volatile memory, such as a random-access memory (RAM) and/or a non-volatile memory, such as a flash memory or the like. In some embodiments, the memory 503 may include a combination of memories of any suitable types.

The controller 502 may include a processor, such as a central processing unit (CPU). The processor may further include a hardware chip. The hardware chip may include an application-specific integrated circuit (ASIC), a programmable logic device (PLD), or a combination thereof. The above-described PLD may include a complex programmable logic device (CPLD), a field-programmable gate array (FPGA), and/or the like.

In some embodiments, the memory 503 may be configured to store program instructions. The controller 502 may execute the program instructions to perform a method consistent with the disclosure, such as one of the aircraft-based function control methods described above with reference to of FIGS. 2 and 3.

In some embodiments, the controller 502 may execute the program instructions stored in the memory 503 to obtain a flight parameter of the aircraft during flight, to analyze the flight parameter according to a preset control condition, and to control an operation component carried by the aircraft to operate if an analysis result indicates that the flight parameter satisfies the control condition. The flight parameter may be a selected parameter to control the operation component to operate, and the flight parameter may include a flight time parameter and/or a flight distance parameter. The flight parameter satisfying the control condition may include that the flight time parameter satisfies a time requirement included in the control condition, and/or that the flight distance parameter satisfies a distance requirement included in the control condition.

In some embodiments, the controller 502 may be further configured to detect whether the aircraft starts to fly a selected target flight segment of a preset flight route after the preset flight route is received, and perform obtaining the flight parameter of the aircraft during the flight if it is detected that the aircraft starts to fly the selected target segment of the preset flight route after the preset flight route is received.

In some embodiments, the controller 502 may be further configured to receive a configured control parameter. The control parameter may include at least one of a parameter for adjusting an operation angle of the operation component in an operation process, an operation time duration parameter, or an operation component parameter.

In some embodiments, the obtained flight time parameter may include a flight time duration obtained by starting timing after the aircraft is detected to have taken off. The flight parameter satisfying the time requirement included in the control condition may include that the flight time duration is equal to a time duration configured in the control condition.

In some embodiments, the obtained the flight time parameter may include a calculated time interval after the aircraft takes off. The flight time parameter satisfying the time requirement included in the control condition may include that the time interval is equal to an interval configured in the control condition.

In some embodiments, the obtained flight distance parameter may include calculated length information of a traveled portion of the flight route after the aircraft is detected to have taken off the flight distance parameter satisfying the distance requirement included in the control condition may include that the calculated length information is the same as length information included in the control condition.

In some embodiments, the obtained flight distance parameter may include calculated flight altitude information after the aircraft is detected to have taken off. The flight distance parameter satisfying the distance requirement included in the control condition may include that the calculated flight altitude information is the same as altitude information included in the control condition.

In some embodiments, the controller 502 may be further configured to obtain a mapping parameter, determine a time requirement and/or a distance requirement of an operation according to the mapping parameter, and preset the control condition according to the time requirement and/or the distance requirement. The mapping parameter may include a flight altitude or an operation coverage ratio.

For implementations of the controller 502 of the aircraft of the present disclosure, reference can be made to the descriptions of related contents in the above-described embodiments, such as embodiments corresponding to FIGS. 1 to 3, which are not repeated here.

According to the present disclosure, an operation component such as a camera or a spraying device carried by an aircraft can be controlled to operate according to a flight parameter of the aircraft and a control condition configured based on user needs. Automatic control such as operations at a preset time and/or a preset distance may be achieved to satisfy user needs for automation and intellectualization of photographing, spraying, or another operation. Further, according to the user's needs, the function control of the operation component can be performed on some or all flight segments of a flight route, such that the aircraft-based operation control may be more intelligent.

Figure 6:
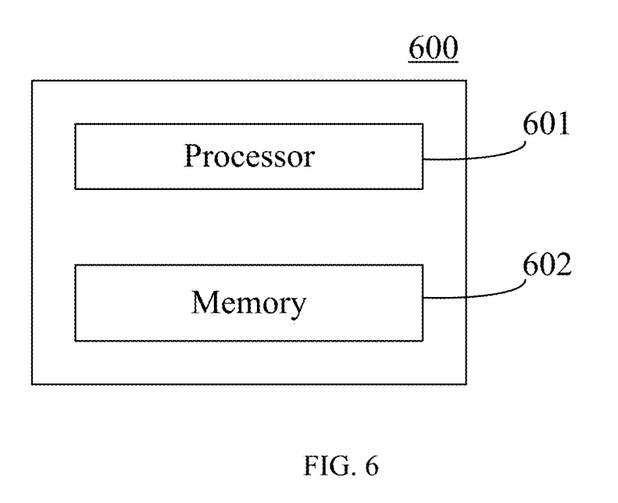
FIG. 6 illustrates a block diagram of an exemplary smart terminal according to various disclosed embodiments of the present disclosure.

FIG. 6 illustrates a block diagram of an exemplary smart terminal 600 according to various disclosed embodiments of the present disclosure. As shown in FIG. 6, the smart terminal 600 includes a processor 601 and a memory 602. The memory 602 stores instructions for execution by the processor 601 to perform a method consistent with the disclosure, such as one of above-described methods. In some embodiments, the processor 601 may include a microprocessor. In some embodiments, the memory 602 may include a read only memory (ROM) or a random access memory (RAM). The smart terminal 600 may further includes other structures, such as a communication interface (not shown in FIG. 6). In some embodiments, the processor 601 may control the communication interface to communicate with an aircraft.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A control method for an aircraft, comprising:
obtaining, by an obtaining circuit of a control device in the aircraft, a flight parameter of an aircraft during flight, the flight parameter being configured to control an operation component carried by the aircraft and including at least one of a flight time parameter or a flight distance parameter; and
controlling, by a processing circuit of the control device in the aircraft, the operation component to operate in response to at least one of:
the flight time parameter satisfying a time requirement included in a control condition, or
the flight distance parameter satisfying a distance requirement included in the control condition; and
selecting an angle of a gimbal of the aircraft through a user interface,
wherein the gimbal is configured to carry the operation component.

2. The method according to claim 1, further comprising, before obtaining, by the obtaining circuit of the control device in the aircraft, the flight parameter of the aircraft during flight:
detecting, by a detecting circuit of the control device, whether the aircraft starts to fly a target flight segment of a flight route; and
in response to detecting, by the detecting circuit, that the aircraft starts to fly the target segment, obtaining, by the obtaining circuit, the flight parameter of the aircraft.

3. The method according to claim 1, further comprising:
receiving, by a configuring circuit of the control device, a configured control parameter including at least one of:
an adjusting parameter for adjusting an operation angle of the operation component in an operation process,
an operation time duration parameter, or
an operation component parameter.

4. The method according to claim 1, wherein:
the flight time parameter includes a flight time duration obtained by starting timing after the aircraft takes off, and
the flight time parameter satisfying the time requirement included in the control conditions includes that the flight time duration is equal to a time duration configured in the control condition.

5. The method according to claim 1, wherein:
the flight time parameter includes a time interval after the aircraft takes off, and
the flight time parameter satisfying the time requirement included in the control condition includes that the time interval is equal to an interval configured in the control condition.

6. The method according to claim 1, wherein:
the flight distance parameter includes calculated length information of a traveled portion of a flight route after the aircraft takes off, and
the flight distance parameter satisfying the distance requirement included in the control condition includes that the calculated length information is same as length information included in the control condition.

7. The method according to claim 1, wherein:
the flight distance parameter includes calculated flight altitude information after the aircraft takes off, and
the flight distance parameter satisfying the distance requirement included in the control condition includes that the calculated flight altitude information is same as altitude information included in the control condition.

8. The method according to claim 1, further comprising:
obtaining, by an operation configuration circuit of the control device, a mapping parameter including one of a flight altitude or an operation coverage ratio;
determining, by the operation configuration circuit, at least one of the time requirement or the distance requirement according to the mapping parameter; and
presetting, by the operation configuration circuit, the control condition according to the at least one of the time requirement or the distance requirement.

9. A control device, comprising:
a processor;
a memory storing instructions that, when executed by the processor, cause the processor to:
obtain a flight parameter of an aircraft during flight, the flight parameter being configured to control an operation component carried by the aircraft and including at least one of a flight time parameter or a flight distance parameter; and
control the operation component to operate in response to at least one of:
the flight time parameter satisfying a time requirement included in a control condition, or
the flight distance parameter satisfying a distance requirement included in the control condition; and a user interface for selecting an angle of a gimbal of the aircraft,
wherein the gimbal is configured to carry the operation component.

10. The device according to claim 9, wherein the instructions further cause the processor to, before obtaining the flight parameter of the aircraft during flight:
detect whether the aircraft starts to fly a target flight segment of a flight route; and
in response to detecting that the aircraft starts to fly the target segment, obtain the flight parameter of the aircraft.

11. The device according to claim 9, wherein the instructions further cause the processor to:
receive a configured control parameter including at least one of:
an adjusting parameter for adjusting an operation angle of the operation component in an operation process,
an operation time duration parameter, or
an operation component parameter.

12. The device according to claim 9, wherein:
the flight time parameter includes a flight time duration obtained by starting timing after the aircraft takes off, and
the flight time parameter satisfying the time requirement included in the control conditions includes that the flight time duration is equal to a time duration configured in the control condition.

13. The device according to claim 9, wherein:
the flight time parameter includes a time interval after the aircraft takes off, and
the flight time parameter satisfying the time requirement included in the control condition includes that the time interval is equal to an interval configured in the control condition.

14. The device according to claim 9, wherein:
the flight distance parameter includes calculated length information of a traveled portion of a flight route after the aircraft takes off, and
the flight distance parameter satisfying the distance requirement included in the control condition includes that the calculated length information is same as length information included in the control condition.

15. The device according to claim 9, wherein:
the flight distance parameter includes calculated flight altitude information after the aircraft takes off, and
the flight distance parameter satisfying the distance requirement included in the control condition includes that the calculated flight altitude information is same as altitude information included in the control condition.

16. The device according to claim 9, wherein the instructions further cause the processor to:
obtain a mapping parameter including one of a flight altitude or an operation coverage ratio;
determine at least one of the time requirement or the distance requirement according to the mapping parameter; and
preset the control condition according to the at least one of the time requirement or the distance requirement.

* * * * *